United States Patent [19]  [11] Patent Number: 5,015,608
Matsuhisa et al.  [45] Date of Patent: May 14, 1991

[54] HIGH HARDNESS SILICON NITRIDE SINTERED BODIES

[75] Inventors: Tadaaki Matsuhisa, Kasugai; Issei Hayakawa, Nagoya, both of Japan

[73] Assignee: NGK Insulators, Ltd., Nagoya City, Japan

[21] Appl. No.: 379,704

[22] Filed: Jul. 12, 1989

Related U.S. Application Data

[63] Continuation of Ser. No. 132,260, Dec. 14, 1987, abandoned.

[30] Foreign Application Priority Data

Dec. 27, 1986 [JP] Japan .................. 61-310209

[51] Int. Cl.$^5$ .................................... C04B 35/58
[52] U.S. Cl. .......................... 501/97; 501/98
[58] Field of Search ..................... 501/97, 98

[56] References Cited

U.S. PATENT DOCUMENTS

| | | | |
|---|---|---|---|
| 4,124,402 | 11/1978 | Greskovich et al. | 501/97 X |
| 4,216,021 | 8/1980 | Hattori et al. | 501/97 |
| 4,407,970 | 10/1983 | Komatsu et al. | 501/97 |
| 4,443,394 | 4/1984 | Ezis | 501/97 X |
| 4,560,669 | 12/1985 | Matsuhiro et al. | 501/97 |
| 4,628,039 | 12/1986 | Mizutani et al. | 501/97 |
| 4,746,636 | 5/1988 | Yokoyama | 501/97 |
| 4,769,350 | 9/1988 | Nishioke et al. | 501/97 X |
| 4,820,665 | 4/1989 | Ukai et al. | 501/98 X |

FOREIGN PATENT DOCUMENTS

| | | | |
|---|---|---|---|
| 0035777 | 9/1981 | European Pat. Off. | 501/97 |
| 0117936 | 9/1984 | European Pat. Off. | 501/97 |
| 0124989 | 11/1984 | European Pat. Off. | 501/97 |
| 0088171 | 5/1983 | Japan | 501/97 |
| 0137873 | 7/1985 | Japan | 501/97 |
| 4560669 | 12/1985 | Japan . | |

*Primary Examiner*—Karl Group
*Attorney, Agent, or Firm*—Parkhurst, Wendel & Rossi

[57] ABSTRACT

A high hardness silicon nitride sintered body which includes 10~50% of a $\alpha$-$Si_3N_4$ per total weight of silicon nitride and has a Knoop hardness of not less than 15.5 Gpa, and is use as a bearing material or the like.

13 Claims, 2 Drawing Sheets

FIG_1

HIGH HARDNESS SILICON NITRIDE SINTERED BODIES

This is a continuation of U.S. application Ser. No. 132,260, filed Dec. 14, 1987, now abandoned.

BACKGROUND OF THE INVENTION

1. Field of the Invention

This invention relates to a silicon nitride sintered body having high hardness and strength.

2. Related Art Statement

Recently, there have been various advanced attempts for using ceramics as structural materials for machines and the like, by utilizing the lightweight properties, thermal resistance, abrasion resistance and so on inherent to ceramics.

Particularly, it is known that when the ceramics are used as a bearing material, it is important to grasp the rolling fatigue life of the ceramic material. In order to enhance the rolling fatigue life, it is important to utilize materials having high strength.

Under such circumstances, there have hitherto been known a method of producing high density silicon nitride by converting a greater part of $\alpha$-type silicon nitride ($Si_3N_4$) into $\beta$-type silicon nitride, and the like. These techniques aim to provide high strength silicon nitride products.

However, the inventors have made studies from all angles with respect to the bearing material and confirmed that it is favorable to include a given amount of $\alpha$-type silicon nitride in the bearing material in order to enhance the rolling fatigue life among, as well as other properties required for use in the bearing material or the like. That is, it has been found that the hardness can be increased and the high strength can be maintained by including a given amount of $\alpha$-type silicon nitride and the improved rolling fatigue life is first obtained by this synergistic action, and consequently the invention has been accomplished.

SUMMARY OF THE INVENTION

According to the present invention, there is the provision of a high hardness silicon nitride sintered body comprising 10~50% of $\alpha$-type silicon nitride per total weight of silicon nitride and having a Knoop hardness of not less than 15.5 Gpa.

BRIEF DESCRIPTION OF THE DRAWINGS

The invention will be described with reference to the accompanying drawings, wherein.

DESCRIPTION OF THE PREFERRED EMBODIMENTS

Figure 1:
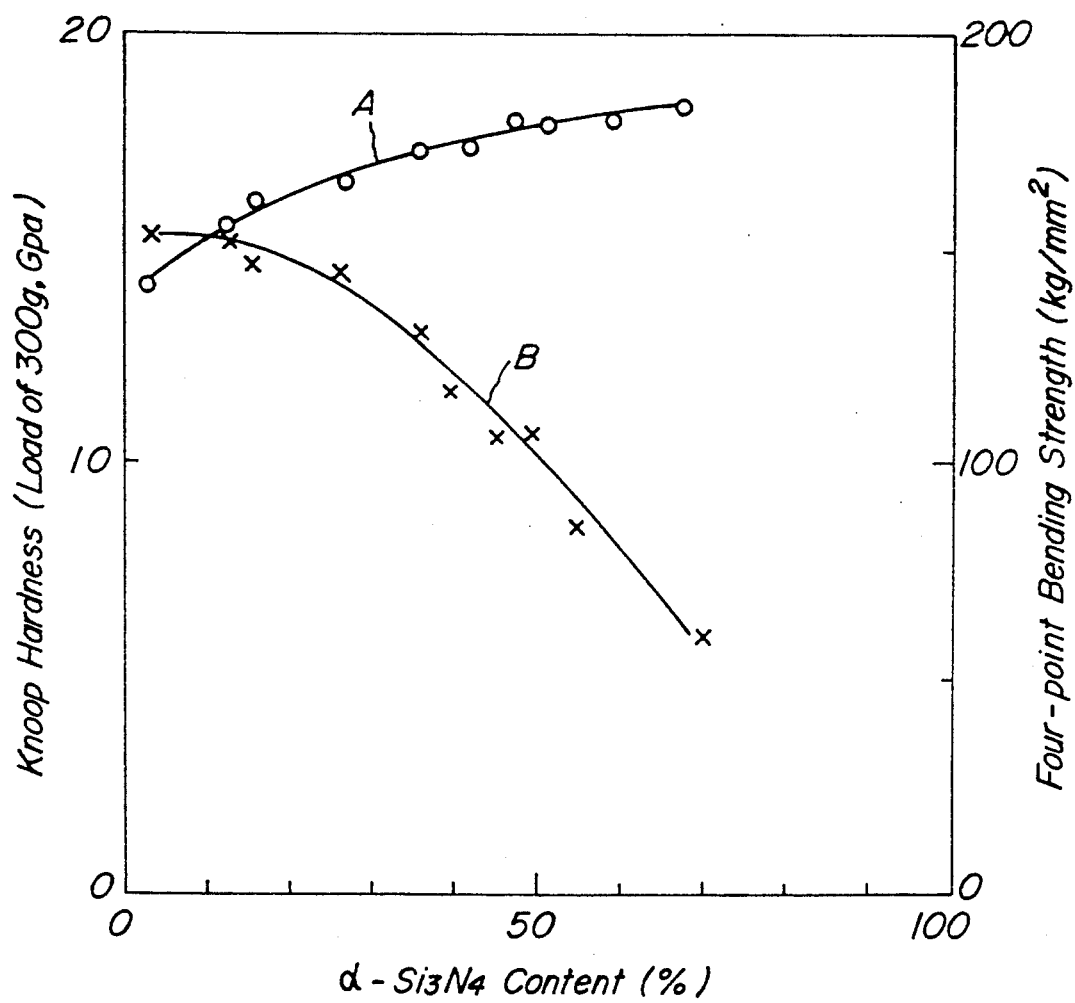
FIG. 1 is a graph showing a relationship of $\alpha$-$Si_3N_4$ content to Knoop hardness and four-point bending strength, wherein curve A shows the Knoop hardness and a curve B shows the four-point bending strength.

In the silicon nitride sintered body according to the invention, the content of $\alpha$-type silicon nitride is 10~50%, preferably 15~45%, more particularly 26~40% as a weight ratio. When the content of $\alpha$-type silicon nitride is less than 10%, the Knoop hardness becomes less than 15.5 Gpa and the high hardness silicon nitride is hardly obtained, while when it exceeds 50%, the strength lowers. That is, when the content of $\alpha$-type silicon nitride is outside the range defined in the invention, the sintered body having improved mechanical durabilities such as abrasion resistance, rolling fatigue life and the like are hardly obtained.

Furthermore, in the silicon nitride sintered body according to the invention, the Knoop hardness is not less than 15.5 Gpa, preferably not less than 16 Gpa, more particularly not less than 16.5 Gpa. When the Knoop hardness is less than 15.5 Gpa, the hardness required as the bearing material can not be satisfied.

Moreover, the sintered body is favorable to have a bending strength of not less than 100 kg/mm$^2$, preferably not less than 110 kg/mm$^2$. Because, when the bending strength is not less than 100 kg/mm$^2$, the resistance to mechanical stress increases and breakage usually results.

The silicon nitride sintered body according to the invention is further favorable to have a Young's modulus of not less than 290 Gpa, preferably not less than 295 Gpa, more particularly not less than 300 Gpa. Because, when the Young's modulus is not less than 290 Gpa, the abrasion resistance becomes favorably large.

The content of $\alpha$-type silicon nitride in the silicon nitride sintered body according to the invention can be controlled to a desired value by properly changing conditions such as temperature and holding time in hot isostatic press treatment (HIP) at the following production step, temperature and holding time at primary sintering step, kind, amount and combination of additives, and so on.

Moreover, the content of $\alpha$-type silicon nitride ($Si_3N_4$) in the silicon nitride sintered body is measured as follows.

It is determined from a ratio in peak height between $\alpha$-$Si_3N_4$ (No. 9-250) and $\beta$-$Si_3N_4$ (No. 9-259) shown in JCPDS Card according to the following equation by means of an X-ray diffraction device:

$$\alpha\text{-}Si_3N_4 \text{ content} = \frac{I_{\alpha(102)} + I_{\alpha(210)}}{I_{\alpha(102)} + I_{\alpha(210)} + I_{\beta(101)} + I_{\beta(210)}} \times 100(\%),$$

where $I_{\alpha(102)}$ is a peak height of $\alpha$-$Si_3N_4$ (102), $I_{\alpha(210)}$ is a peak height of $\alpha$-$Si_3N_4$ (210), $I_{\beta(101)}$ is a peak height of $\beta$-$Si_3N_4$ (101), and $I_{\beta(210)}$ is a peak height of $\beta$-$Si_3N_4$ (210).

The silicon nitride sintered bodies according to the invention are preferably used in not only a bearing member such as antifriction bearing, slide bearing or the like but also a sliding member used in a sliding portion of an air slide, a bed of a lathe or the like as well as a wear-resistant member used in a portion contacting with a moving object such as gas, liquid, particle or the like (e.g. pebble, nozzle).

The following examples are given in illustration of the invention and are not intended as limitations thereof.

EXAMPLE 1~7, COMPARATIVE EXAMPLES 1~3

One hundred parts by weight of $Si_3N_4$ powder having an average particle size of 0.5 $\mu$m ($\alpha$-$Si_3N_4$ content: 96%) was mixed with 7 parts by weight of $Y_2O_3$, 4 parts by weight of MgO and 1 part by weight of $ZrO_2$ as a sintering aid and further with 100 parts by weight of water, which were mixed and pulverized in a batch type pulverizer. The resulting slurry was added with 2 parts by weight of polyvinyl alcohol (PVA), which was rendered into granulated powders by means of a spray drier. Then, these powders were subjected to a cold isostatic press molding (CIP) under a pressure of 5 tons/cm² to thereby produce a shaped body of 65 mm (diameter)×50 mm (length).

Thereafter, the shaped body was degreased by raising temperature at a temperature rising rate of 100° C./hr and holding at 500° C. for 10 hours in a hot air circulating furnace. The treated body was subjected to a pressureless sintering in a nitrogen gas atmosphere at a temperature of 1,480° C. for a holding time of 6 hours (primary sintering step) and then to a hot isostatic press treatment (HIP). The HIP conditions were an atmosphere of $N_2$ gas, a pressure of 400 atm and a temperature of 1,530~1,750° C. By varying the temperature among HIP conditions, various samples having different $\alpha$-$Si_3N_4$ contents and Knoop hardnesses were obtained.

The properties of the resulting sintered body samples are shown in the following Table 1.

A disc of 50 mm (diameter)×10 mm (thickness) was cut out from the HIP treated sample and polished into a mirror state, which was subjected to a rolling fatigue test at a hertz stress of 500 kg/mm² using a six-ball thrust type bearing tester. The test results are also shown in Table 1.

Figure 2:
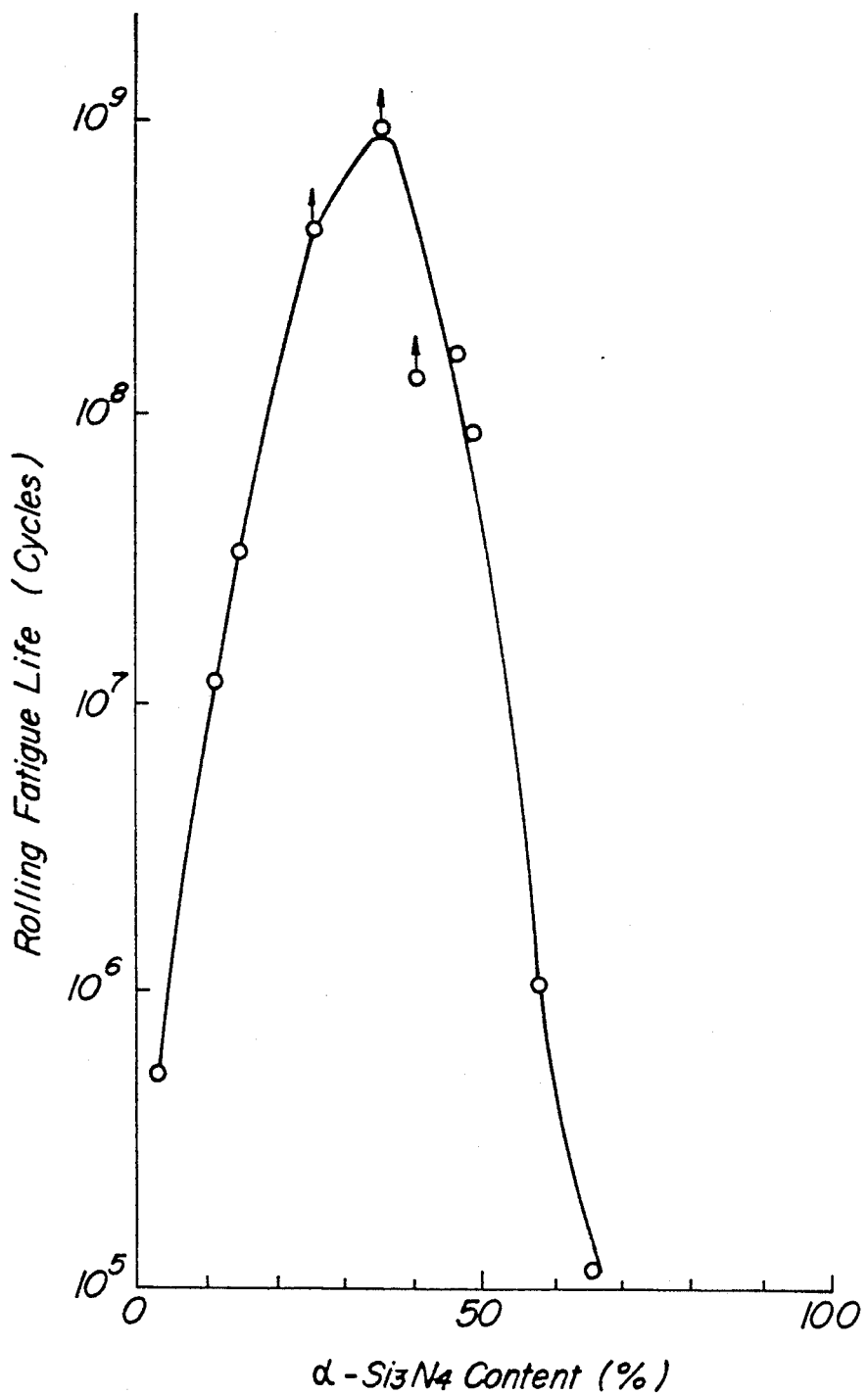
FIG. 2 is a graph showing a relation between $\alpha$-$Si_3N_4$ content and rolling fatigue life.

By graphing the results of Table 1, FIG. 1 (which shows a relation of $\alpha$-$Si_3N_4$ content to Knoop hardness and four-point bending strength) and FIG. 2 (which shows a relation between $\alpha$-$Si_3N_4$ content and rolling fatigue life) were obtained.

As seen from Table 1 and FIGS. 1 and 2, the silicon nitride sintered bodies satisfying the content of $\alpha$-type silicon nitride and Knoop hardness defined in the invention (Examples 1~7) show a high rolling fatigue life of not less than $10^7$ cycles, while the samples having the $\alpha$-$Si_3N_4$ content and Knoop hardness outside the ranges of the invention (Comparative Examples 1~3) show a low rolling fatigue life of not more than $10^6$ cycles.

TABLE 1

| Sample No. | $\alpha$-$Si_3N_4$ content (%) | Knoop hardness, load of 300 g (Gpa) | Four-point bending strength (kg/mm²) | Young's modulus (Gpa) | Rolling fatigue life (cycles) |
| --- | --- | --- | --- | --- | --- |
| Example | | | | | |
| 1    1 | 12 | 15.6 | 152 | 292 | $1 \times 10^7$ |
| 2    2 | 15 | 16.0 | 148 | 298 | $2.8 \times 10^7$ |
| 3    3 | 26 | 16.2 | 145 | 300 | $>30 \times 10^7$ |
| 4    4 | 35 | 17.0 | 130 | 305 | $>67 \times 10^7$ |
| 5    5 | 40 | 17.2 | 115 | 306 | $>10 \times 10^7$ |
| 6    6 | 45 | 18.0 | 106 | 320 | $20 \times 10^7$ |
| 7    7 | 49 | 17.9 | 103 | 302 | $12 \times 10^7$ |
| Comparative Example | | | | | |
| 1    8 | 3 | 14.1 | 155 | 260 | $0.05 \times 10^7$ |
| 2    9 | 57 | 17.8 | 89 | 268 | $0.1 \times 10^7$ |
| 3    10 | 65 | 18.1 | 62 | 258 | $0.01 \times 10^7$ |

EXAMPLES 8~10, COMPARATIVE EXAMPLES 4~5

One hundred parts by weight of $Si_3N_4$ powder having an average particle size of 0.3 μm was added with sintering aids shown in the following Table 2 (Sample No. 11~15) and 100 parts by weight of water and mixed and pulverized in an oscillation mill for 5 hours. The resulting slurry was then dried in a constant temperature drier. The dried matter was passed through a sieve of 149 μ to obtain granulated powders. Next, these powders were subjected to a cold isostatic press molding (CIP) under a pressure of 3 tons/cm² to obtain a shaped body of 30 mm (diameter)×100 mm (length). The shaped body was fired at a normal pressure in an atmosphere of $N_2$ gas under the firing conditions shown in Table 2 to obtain a sintered body. The properties of the resulting sintered body are also shown in Table 2.

A disc of 15 mm (diameter)×15 mm (length) was cut out from the pressureless sintered body of Sample No. 11~15 and polished with #140 diamond whetstone, which was subjected to an abrasion test through a ball mill. As the test conditions, an alumina vessel of 120 mm in diameter was used while rotating at 120 rpm. Furthermore, #100 silicon carbide powder and water were mixed at a weight ratio of 1:1 to form a slurry solution, which was placed into the vessel up to a half depth thereof. Then, the above five discs were added to the slurry solution and tested for 24 hours.

The abrasion loss was measured from the weight and size before and after the test.

Moreover, the Knoop hardness, four-point bending strength and Young's modulus were measured according to methods of JIS Z2251, JIS R1601 and JIS R1602 (dynamic modulus through a superwave pulse process), respectively.

TABLE 2

| Sample No. | Sintering aid (part by weight) | | | Firing conditions | | $\alpha$-$Si_3N_4$ content (%) | Knoop hardness, load of 300 g (Gpa) | Four-point bending strength (kg/mm²) | Young's modulus (Gpa) | Abrasion loss (mg/cm²) |
| --- | --- | --- | --- | --- | --- | --- | --- | --- | --- | --- |
| | $Y_2O_3$ | MgO | $ZrO_2$ | Temperature (°C.) | Time (Hr) | | | | | |
| Example | | | | | | | | | | |
| 8    11 | 5 | 3 | 2 | 1,650 | 1 | 20 | 16.1 | 118 | 293 | 0.05 |
| 9    12 | 4 | 2 | 2 | 1,630 | 2 | 34 | 16.5 | 103 | 297 | 0.01 |
| 10   13 | 3 | 1 | 1 | 1,720 | 1 | 12 | 15.5 | 104 | 290 | 0.15 |
| Comparative Example | | | | | | | | | | |

TABLE 2-continued

| Sample No. | Sintering aid (part by weight) | | | Firing conditions | | $\alpha$-Si$_3$N$_4$ content (%) | Knoop hardness, load of 300 g (Gpa) | Four-point bending strength (kg/mm$^2$) | Young's modulus (Gpa) | Abrasion loss (mg/cm$^2$) |
|---|---|---|---|---|---|---|---|---|---|---|
| | Y$_2$O$_3$ | MgO | ZrO$_2$ | Temperature (°C.) | Time (Hr) | | | | | |
| 4 | 14 | 7 | 4 | 2 | 1,680 | 1 | 0 | 15.0 | 117 | 280 | 0.9 |
| 5 | 15 | 3 | 1 | 1 | 1,600 | 3 | 60 | 15.4 | 52 | 282 | 5.0 |

As mentioned above, the invention can provide high hardness silicon nitride sintered bodies simultaneously satisfying the Knoop hardness and bending strength required for not only bearing materials but also wear-resistant materials and sliding materials.

What is claimed is:

1. A high hardness silicon nitride sintered body for use as a bearing material prepared from a mixture including 3-7 wt% Y$_2$O$_3$, 1-4 wt% MgO and 1-2 wt% ZrO$_2$ as sintering aids, said sintered body consisting essentially of 10-50 wt% $\alpha$-Si$_3$N$_4$ with the remainder being $\beta$-Si$_3$N$_4$, wherein said sintered body has a Knoop hardness of not less than 15.5 GPa, a bending strength of not less than 100 kg/mm$^2$ and a rolling fatigue life of not less than $1 \times 10^7$ cycles.

2. A high hardness silicon nitride sintered body according to claim 1, wherein said $\alpha$-Si$_3$N$_4$ is present in an amount of 15-45 wt% and said sintered body has a Knoop hardness of not less than 16.0 GPa.

3. A high hardness silicon nitride sintered body according to claim 1, wherein said $\alpha$-Si$_3$N$_4$ is present in an amount of 26-40 wt% and said sintered body has a Knoop hardness of not less than 16.5 GPa.

4. A high hardness silicon nitride sintered body according to claim 1, wherein said sintered body has a Young's modulus of not less than 290 GPa.

5. A high hardness silicon nitride sintered body according to claim 1, wherein said sintered body has a Young's modulus of not less than 295 GPa.

6. A high hardness silicon nitride sintered body according to claim 1, wherein said sintered body has a Young's modulus of not less than 300 GPa.

7. A hot isostatic pressed high hardness silicon nitride sintered body for use as a bearing material prepared from a mixture including 3-7 wt% Y$_2$O$_3$, 1-4 wt% MgO and 1-2 wt% ZrO$_2$ as sintering aids, said sintered body consisting essentially of 15-45 wt% $\alpha$-Si$_3$N$_4$ with the remainder being $\beta$-Si$_3$N$_4$, wherein said sintered body has a Knoop hardness of not less than 16.0 GPa, a bending strength of not less than 100 kg/mm$^2$ and a rolling fatigue life of not less than $1 \times 10^7$ cycles.

8. A hot isostatic pressed high hardness silicon nitride sintered body according to claim 7, wherein said $\alpha$-Si$_3$N$_4$ is present in an amount of 26-40 wt% and said sintered body has a Knoop hardness of not less than 16.5 GPa.

9. A hot isostatic pressed high hardness silicon nitride sintered body according to claim 7, wherein said sintered body has a Young's modulus of not less than 290 GPa.

10. A hot isostatic pressed high hardness silicon nitride sintered body according to claim 7, wherein said sintered body has a Young's modulus of not less than 295 GPa.

11. A hot isostatic pressed high hardness silicon nitride sintered body according to claim 7, wherein said sintered body has a Young's modulus of not less than 300 GPa.

12. A hot isostatic pressed high hardness silicon nitride sintered body for use as a bearing material consisting essentially of 10-50 wt% $\alpha$-Si$_3$N$_4$ with the remainder being $\beta$-Si$_3$N$_4$, said body being formed by a method comprising:

mixing Si$_3$N$_4$ powder with 3-7 wt% Y$_2$O$_3$, 1-4 wt% MgO and 1-2 wt% ZrO$_2$ powders to form an initial mixture;

pulverizing said initial mixture to form a resultant mixture;

drying said resultant mixture to form a powder;

shaping said powder to form a shaped powder compact; and sintering said shaped powder compact in an N$_2$ atmosphere at a temperature of about 1600-1720° C. for about 1-3 hours to form said sintered body;

wherein said sintered body has a Knoop hardness of not less than 15.5 GPa, a bending strength of not less than 100 kg/mm$^2$ and a rolling fatigue life of not less than $1 \times 10^7$ cycles.

13. A hot isostatic pressed high hardness silicon nitride sintered body for use as a bearing material consisting essentially of 10-50 wt% $\alpha$-Si$_3$N$_4$ with the remainder being $\beta$-Si$_3$N$_4$, said body being formed by a method comprising:

mixing Si$_3$N$_4$ powder, predominantly consisting of 96% by weight $\alpha$-Si$_3$N$_4$, with 3-7 wt% Y$_2$O$_3$, 1-4 wt% MgO and 1-2 wt% ZrO$_2$ powders to form an initial mixture;

pulverizing said initial mixture to form a resultant mixture;

drying said resultant mixture to form a powder;

shaping said powder to form a shaped powder compact;

pressureless sintering said shaped powder compact to form a sintered body; and hot isostatic pressing said sintered body in an N$_2$ atmosphere at a pressure of 400 atm and a temperature of about 1530-1750° C. to form a hot pressed sintered body;

wherein said hot isostatic pressed sintered body has a Knoop hardness of not less than 15.5 GPa, a bending strength of not less than 100 kg/mm$^2$ and a rolling fatigue life of not less than $1 \times 10^7$ cycles.

* * * * *